United States Patent [19]

Kiriake et al.

[11] Patent Number: 4,463,909
[45] Date of Patent: Aug. 7, 1984

[54] COP SUPPLYING SYSTEM IN AUTOMATIC WINDER

[75] Inventors: Masaharu Kiriake; Akira Shimano, both of Kyoto, Japan

[73] Assignee: Murata Kikai Kabushiki Kaisha, Kyoto, Japan

[21] Appl. No.: 365,648

[22] Filed: Apr. 5, 1982

[30] Foreign Application Priority Data

Apr. 10, 1981 [JP] Japan .................................. 56-54528
Sep. 30, 1981 [JP] Japan ................................ 56-155540

[51] Int. Cl.³ ...................... B65H 54/20; B65H 67/02
[52] U.S. Cl. .............................................. 242/35.5 A
[58] Field of Search ...................... 242/35.5 A, 35.5 R, 242/35.6 R, 18 R

[56] References Cited

U.S. PATENT DOCUMENTS

| | | | |
|---|---|---|---|
| 2,208,930 | 7/1940 | Kahlisch | 242/35.6 R |
| 2,306,871 | 12/1942 | Esser et al. | 242/35.6 R |
| 3,506,209 | 4/1970 | Matsui et al. | 242/35.5 R |
| 3,850,377 | 11/1974 | Pitts et al. | 242/35.5 A X |
| 3,933,320 | 1/1976 | Tsurumi et al. | 242/35.5 R |
| 4,212,433 | 7/1980 | Matsui et al. | 242/35.5 A |

Primary Examiner—Stanley N. Gilreath
Attorney, Agent, or Firm—Spensley Horn Jubas & Lubitz

[57] ABSTRACT

A cop supplying apparatus in an automatic winder includes a full cop delivery conveyor belt and an empty cop delivery conveyor belt arranged along each of a plurality of winding units of the winder. A cop fitted on an individual cop deliverying carrier is travelled on the conveyor belt and a passage for receiving the carrier from the conveyor belt is formed in each winding unit. The cops are located at predetermined position of the passage and after a predetermined number of carriers have been stored on the passage, subsequent cops are blocked by the last carrier stored in the passage. The device for delivering the cop to the yarn feed position from the conveyor belt is constructed by a rotary disc and guide plates which are forming the passage for the carrier on the disc.

8 Claims, 7 Drawing Figures

COP SUPPLYING SYSTEM IN AUTOMATIC WINDER

BACKGROUND OF THE INVENTION

It has been proposed and described in U.S. Pat. No. 3,506,209 that cops are supported in their respective containers and delivered to their respective winding unit where the cop is taken out from the container and supplied to the winding unit of an automatic winder by an automatic cop supplying apparatus provided to each automatic winder. In this known apparatus, there are disadvantages in that formation of fluffs on the surface of yarn layers of cops or crumbling of yarn layers of cops is readily caused to occur during this operation. Moreover, additional space becomes necessary for arranging the forgoing device and apparatus.

In the U.S. Pat. No. 3,933,320 there has been proposed an apparatus in which a magazine for storing a plurality of cops is arranged for each stationary winding unit and when cop supply to the winder is necessary, one cop is let to fall down from the magazine and is mounted onto a peg located below the winding unit through a chute. When this apparatus is adopted, however, an apparatus or special worker becomes necessary for feeding cops to the magazine. When a cop is let to fall down from the magazine and is inserted into the peg, if the core of the cop is not in alignment with the axis of the peg, the cop is not mounted onto the peg but is caught in the chute or dropped on the machinery room floor, with the result that such troubles as soiling of the surface of the yarn layer are caused.

SUMMARY OF THE INVENTION

The present invention relates to a cop supplying apparatus in an automatic winder. The present invention is accomplished to eliminate above-mentioned disadvantages of the conventional techniques.

A primary object of the present invention is to provide a novel apparatus having a very simple structure and eliminating the function of the cop supply magazine.

In the apparatus of the present invention, a cop is carried on an individual cop delivering carrier (hereinafter referred to as a tray), and is transported, along with like trays carrying cops, on a conveyor belt running along a row of winding units of an automatic winder. A passage for receiving trays from the conveyor belt is formed in each winding unit. The trays, after delivery by the conveyor belt, are located at predetermined positions within the passage and after those predetermined positions have been filled by trays stored in the remaining passage, trays on the cop feed conveyor belt are not supplied to that winding unit any more but they are fed to the next subsequent winding unit. This continues until the passages of each winding unit are supplied with their complement of trays. The conveyor belt then automatically provides trays to replenish the winding unit passages as additional cops are required.

According to the present invention, a cop supplying apparatus is provided so that when a predetermined number of cops, each cop being carried on an independent tray, are delivered to a winding unit by a cop supply conveyor belt. This number of cops are stored in a passage formed on the winding unit. Subsequent cops on their trays are blocked by the last of the trays stored in the passage and are automatically retained on the conveyor belt. By use of this characteristic feature, according to the present invention, there can be attained various advantages. For example, a magazine for storing cops need not be disposed for each winding unit, as was necessary in the conventional method. Furthermore, supply of a fresh cop to the winding unit is accomplished by moving the trays by one position along the passage in the horizontal direction. Therefore, fresh cops can be supplied to the yarn feed position of the winding unit very promptly and assuredly. Moreover, the device for delivering the trays to the yarn feed device position from the conveyor belt is constructed to include a rotary disc and a guide plate having a passage formed on the disc, supply of cops can be accomplished by a very simple structure, and if only trays having a cop carried vertically thereon are supplied onto the conveyor belt, a predetermined number of cops can automatically be stored in the passage of each winding unit.

DETAILED DESCRIPTION OF THE INVENTION

Figure 1:
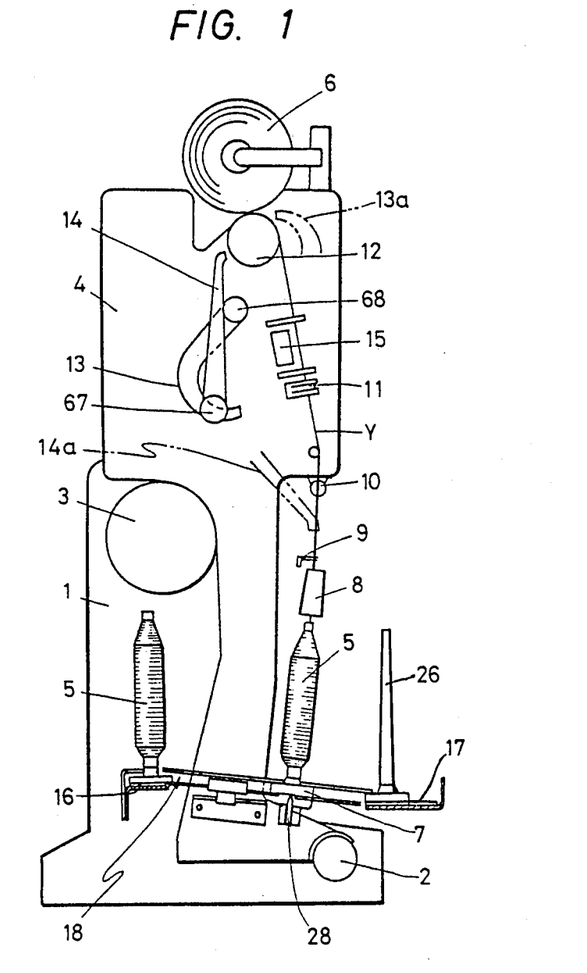
FIG. 1 is a side view illustrating a winding unit to which the apparatus of the present invention is applied.

A brief description of the major features of construction of an automatic winder is first provided to orient the reader to details of the present invention which follow thereafter. Referring first to FIG. 1 illustrating a winding unit to which the apparatus of the present invention is applied, a supporting shaft 2 and a suction pipe 3 are laid out between a pair of parallel side frames 1, and a winding unit 4 is rotatably supported on the supporting shaft 2. While the automatic winder is being operated, the winding unit 4 rests against the suction pipe 3 and is appropriately secured. The suction pipe 3 is connected to a blower not shown in the drawings and a suction air current always acts through the suction pipe 3.

In the above-mentioned winding unit, a yarn taken out from a cop 5, carried on a tray 7, is passed through a balloon breaker 8 and a yarn guide 9. An appropriate tension is given to the yarn by a tenser 10, and the yarn is passed through a slub catcher 11, after which the yarn is wound on a package 6 rotated by a winding drum 12.

When the slub catcher 11 detects the presence of a slub in the yarn during this winding operation, a cutter (not illustrated) arranged in the vicinity of the slub catcher is actuated to cut the running yarn Y and stop the winding operation. Simultaneously a first suction arm 13 and a second suction arm 14 are actuated to guide the cut yarn end from the side nearest the package 6 and the cut yarn end from the side nearest the cop 5, respectively, to a knotter 15 arranged at a position in proximity to but apart from the ordinary yarn passage Y. The knotting operation is then performed by the knotter 15 and the winding operation is started again.

A plurality of winding units 4 having the abovementioned structure are arranged in a direction perpendicular to the plane of FIG. 1 to construct one automatic winder. Identifying, for the purpose of illustration, the right side of the winding unit 4 (as viewed in FIG. 1) to be the front side of the winding unit 4, a cop-supplying conveyor belt 16 is arranged below the winding unit on the opposite back side thereof to run along the extent of the automatic winder. An empty-bobbin discharging conveyor belt 17 is similarly arranged in the lower portion of the front side of the automatic winder. A cop delivery passage 18 is formed between said conveyor belts 16 and 17.

Figure 2:
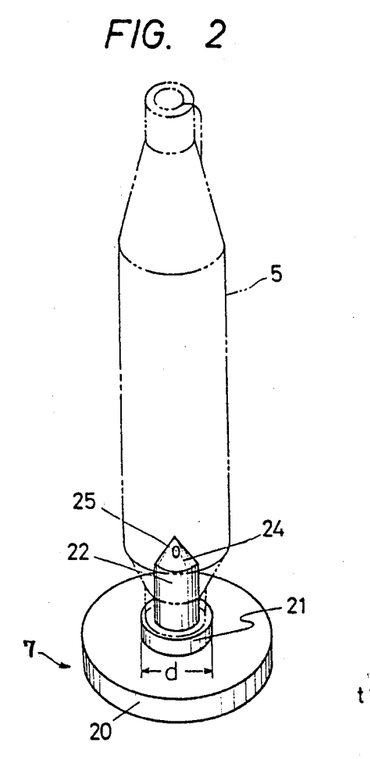
FIG. 2 is a perspective view of a tray which is applied to the apparatus of the present invention.
Figure 3:
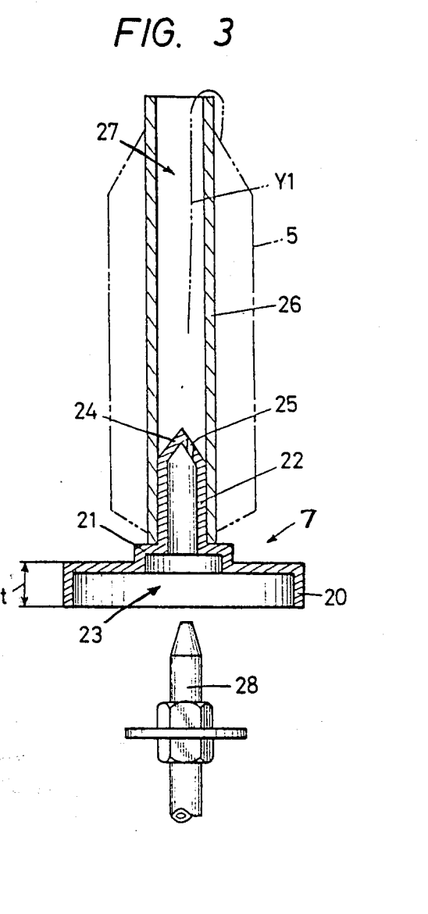
FIG. 3 is a view showing the longitudinal section of a tray shown in FIG. 2 and a side view of an air jetting nozzle.

Referring next to FIGS. 2 and 3, the cop 5 is delivered to the winding unit 4 by the conveyor belt in the state where the cop 5 is fitted on tray 7. The tray 7 is formed of a hollow disc-like base 20 to be placed on the conveyor, a hollow disc-like stand 21 mounted on the top face of the base 21 and a hollow peg 22 vertically projected from the stand 21, which are integrally molded or secured. An opening 23 is formed on the bottom face of the interior of the tray and is communicated with the hollow interior portion of the peg 22. An air jet hole 25 is formed on the inclined face of a hollow, conical top 24 of the peg 22.

The cop 5, including its bobbin 26, where the cop 5 is inserted in the peg 22 of the tray 7 and the lower face of the cop 5 is supported on the stand 21. Incidentally, the yarn end Y1 taken out from the cop is, as delivered by the conveyor belt 16 (FIG. 1) inserted and hung in a central hole 27 of the bobbin 26. When knotting is to be effected, air jetted from a nozzle 28 arranged at a predetermined winding position of the unit is jetted from the interior of the tray 7 into the central hole 27 of the bobbin 26 through the hole 25 of the peg 22, whereby the yarn end Y1 is blown up from the hole 27 and is sucked and held by the second suction arm which has been standing by in the position indicated by the ghost image 14a of the second suction arm of FIG. 1.

A cop supplying apparatus 29 to be mounted on each winding unit will now be described in detail with reference to FIGS. 4 and 5.

First and second guide plates 30 and 31 are secured to the machine stand between the cop-supplying conveyor belt 16 and the empty-bobbin discharging conveyor belt 17 to form a passage for the tray 7. More specifically, a first passage 34 having a width S is defined by a concave curved guide face 32 of the first guide plate 30 and a convex curved guide face 33 of the second guide plate 31. The lower face of said passage is formed as a freely rotatable disc 35. The tray 7 is transferred onto the disc 35 from the conveyor 16, in a manner to be explained later, and by rotation of the disc 35 in the direction of an arrow 36, the tray 7 is delivered along the passage 34. The length of the first passage 34 is such that a predetermined number of trays may be stored in the passage 34. When that number of trays are stored, the edge of the base 20 of the last tray 7c is in agreement with the edge 16a of the conveyor 16.

The disc 35 is supported on a shaft 37 by a bracket 19 secured to the side face of the winding unit 4. The shaft 37 is secured slightly inclined to the vertical plane. Accordingly, the disc 35 freely rotating about the shaft 37 on a bearing 38 is inclined to the horizontal by an angle corresponding to the inclination angle of the shaft 37. In other words, the central axis of the cop 5 on the tray 7 carried on the disc 35 is inclined in a yarn-unwinding direction to improve the yarn-unwinding characteristic. The curved guide faces 32 and 34 of the first and second guide plates 30 and 31 end such that the tray will reach position P for taking out the yarn from the cop. Subsequently guide faces 40 and 41 are formed on the guide plates 30 and 31 to define an empty-bobbin discharging passage 39 having the same width S. A plain plate 42 secured to the bracket is secured slantingly to the lower face of the discharge passage so that the plane of the plate 42 is the same as that of the top face of the disc 35. Incidentally, a clearance 43 is formed between the disc 35 and the plain plate 42, and the position of the clearance 43 coincides with the position P for taking out the yarn from the cop. The clearance 43 provides a passage for air jetted from the air jet nozzle 28 mounted below the plane of the disc 35 and the plate 42.

An annular portion 46 of the disc 35 defined by the periphery 44 of the disc 35 and an imaginary arc 45 on the disc 35 separated by a certain distance l from the periphery 44, the imaginary arc 45 being so that it is tangential to the edge 16a of the conveyor belt 16, and so that the annular portion 46 is pressed to the top face of the side portion of the conveyor belt 16. Accordingly, the disc 35 is rotated by the running force of the conveyor belt 16, and hence, the conveyor belt 16 exerts not only the function of delivering the cop but also the function of driving the disc 35.

A third guide plate 47 is secured to the base of the winder at each winding unit 4 above and behind the conveyor belt 16 to guide trays to the passage 34 of the supplying apparatus 29. The guide plate 47 is secured to the winder so that the guide plate 47 projects over the central portion of the conveyor belt 16 from the rearmost side portion of the conveyor and is separated from the face of the conveyor 16 by a distance of at least the thickness "t" of the base 20 of the tray 7. A second passage 51 is defined by a linear guide face 48 of the guide plate 47 and a curved guide face 49 contiguous to the guide face 48, together with a guide face 50 of the second guide plate 31 confronting the guide plate 47.

A third passage 70 is defined by a guide face 52 of the third guide plate 47 and a guide face 30a of the first guide plate 30. After the predetermined number of cops have been stored in the first passage 34, the edge of the last tray in the first passage is just in agreement with the edge 16a of the conveyor belt 16. Accordingly, the trays of the further delivered cops are blocked from entering the passage 34 by the last tray 7c therein, and they are urged into the third passage 70 by subsequent trays present on the conveyor belt 16, with the result that the trays are delivered through the third passage 70 in the direction of an arrow 67 and are carried by the conveyor belt 16 to the same cop supplying apparatus of the subsequent unit.

The width S of the passages 51, 34, 39 and 70 is adjusted so that the width S is slightly larger than the diameter "d" of the stand 21 portion of the tray 7 and the height H is slightly larger than the thickness "t" of the base 20 of the tray 7.

A turning lever 53 for positioning and discharging the empty bobbin 26 supported on the plate 42 is able to rotate about a shaft 54 between a two-dot chain line position 53a and a solid line position 53. The shaft 54 of the lever 53 is inclined with the same angle as that of the shaft 37 of the disc, 35. Guide faces 55, 56 and 57 of the lever 53 are thus rotated in a plane parallel to the disc 35 and are brought into abutting contact with the stand 21 of the tray 7. When the lever 53 is located at the position indicated by the solid line, a hook portion 58 of the lever 53 projects into the passage 34 and falls in abutting contact with the stand 21 of the tray 7 to effect positioning of the cop during the yarn take-out period. A curved guide face 56 contiguous to the guide face 55 of the hook portion 58 is a guide face for pushing out the tray 7 and discharging it along the discharge passage 39. A guide face 57 which forms a part of a circle concentric with the shaft 54 acts, on rotation, to inhibit delivery of the subsequent tray 7a having a fresh cop fitted thereon while the tray 7 bearing an empty bobbin 26 at the winding position is discharged.

Figure 5:
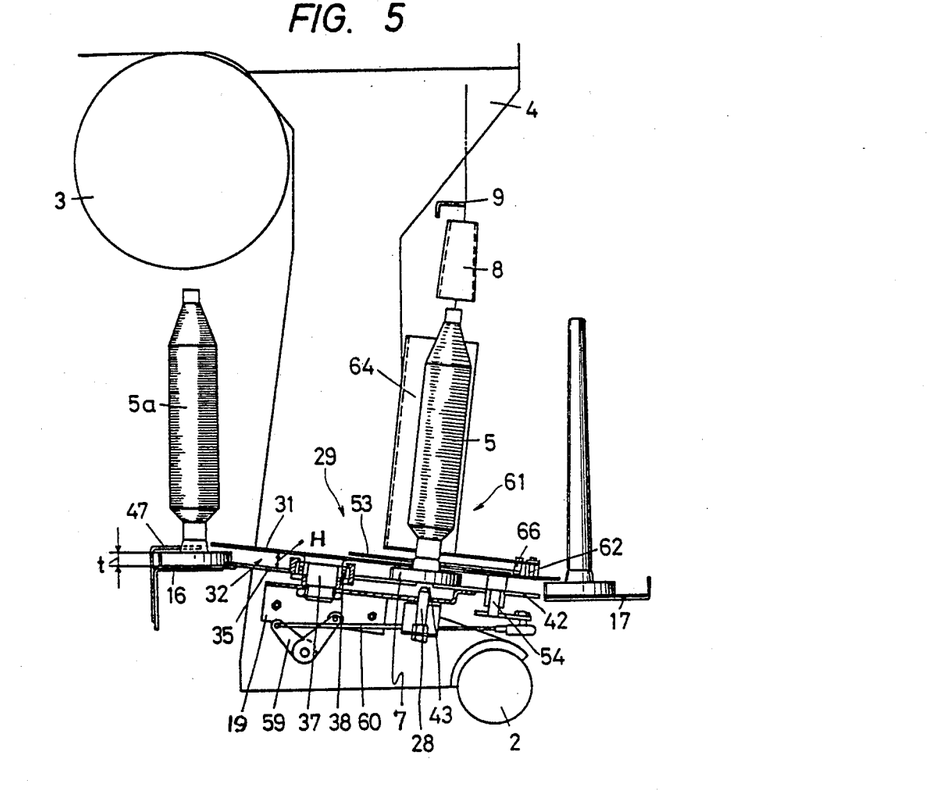
FIG. 5 is a side view partially in section illustrating the apparatus shown in FIG. 4.

Driving of the lever 53 is accomplished by actuating a lever 59 shown in FIG. 5 through a rod (not shown) operated by an instruction from a control means commanding the feed of a fresh cop to the winding unit lever 59 rotates the shaft 42 through a connecting rod 60.

A balloon guide 61 turnable above the lever 53 is supported on a shaft 62. This balloon guide 61 comprises an arm 63 and a curved face plate 64 fitted and secured on the outer end of the arm 63 and is urged in the clockwise direction in FIG. 4 by a spring 65. During the winding operation, the balloon guide 61 is held at a position indicated by the solid line in FIGS. 4 and 5 to prevent the balloon of the yarn taken out from the cop 5 from coming in contact with the subsequent cop standing by in the passage 34. Positioning of the balloon guide 61 is accomplished by abutting contact of the side face of the spring-urged arm 63 with a stopper 66 formed on the end of the cop-discharging lever 53. Accordingly, when the lever 53 is turned to the position 53a indicated by the two-dot chain line in FIG. 4, the balloon guide 61 is turned by the spring 65 in the clockwise direction about the shaft 62, following along with the relocation of the stopper turning of the lever 53. Ultimately, the balloon guide 61 is turned to the position where the arm 63 falls into abutting contact with the stopper 66a located at the position indicated by the two-dot chain line. The curved face plate 64 is thus rotated away from the passage 34 and the tray 7a having a fresh cop fitted thereon is delivered to the yarn feed position P.

Figure 4:
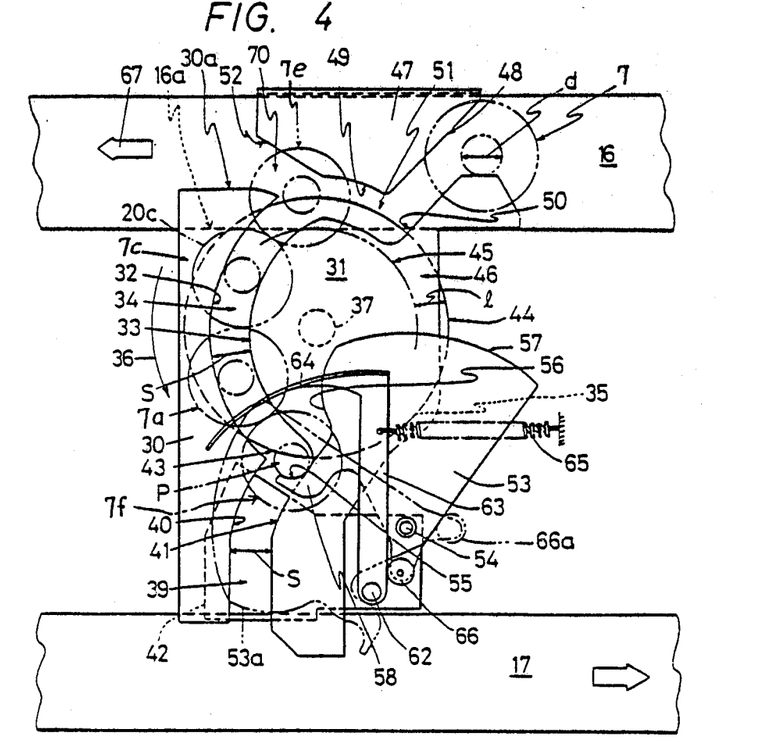
FIG. 4 is a plan view showing one embodiment of the cop supplying apparatus according to the present invention.

In the cop supplying apparatus having the abovementioned structure, a cop 5a formed at a spinning process is fitted on each tray 7 delivered by the conveyor belt 16, and when the tray 7 abuts against the third guide 47 shown in FIG. 4, the tray 7 is delivered along the second passage 51 and the bottom face of the base of the tray is carried onto the disc 35. By rotation of the disc in the direction of the arrow 36, the tray 7 is delivered along the first passage 34 and the tray 7 is stopped when it hits on the hook 58 of the turning 53, at the end of the first passage. When a predetermined number (3 in the embodiment shown in FIG. 4) of the cop-bearing tray 7, which have been delivered as above, are stored, the subsequent tray 7c passes through the first passage 51 and is blocked by abutting contact with the base 20c of the last stored tray 7c. Accordingly, the bottom face of this next subsequent tray 7e being in contact with the conveyor belt 16, as well as the disc 35, continues to move by the frictional forces, and this next subsequent tray 7e is forwarded into the third passage 70 along the guide faces 52 and 30a and is delivered to the subsequent winding unit by the conveyor belt 16. Accordingly, if the conveyor belt 16 is circulated, and sufficient cop-bearing trays 7 are present, predetermined numbers of cops are supplied to all the winding units.

The step of taking out the yarn from the cop 5 located at the predetermined position shown in FIGS. 1 and 4 to start the winding operation is conducted according to the following procedures. The air jet nozzle 28 is arranged below the center of the tray 7 located at the predetermined position so that air jetted from the nozzle 28 is jetted into the central hole of the bobbin 26 of the cop from the hole formed on the peg of the tray as described hereinbefore, with the result that the yarn end Y1 hung down in the central hole 27 of the bobbin is blown up through the cylindrical balloon breaker 8 located above. The second suction arm 14 comes to the vicinity of the two-dot chain line position 14a shown in FIG. 1 from the side of the winding unit, and the yarn end blown up through the balloon breaker 8 is sucked and held by the suction arm 14. The suction arm 14 which has sucked thereon the cop side yarn end is then turned in the counterclockwise direction about the shaft 67, while the first suction arm 13a which has sucked thereon the yarn end from the side nearest the package 6 is turned in the clockwise direction about the shaft 68, whereby both the yarn ends are arranged to intersect each other and are guided into the knotter 15. The knotting operation is performed in the knotter 15 and the normal winding operation is started.

When the cop at the yarn feeding position becomes empty, a detecting device not (illustrated) located on the winding unit is actuated to emit an empty-bobbin discharging instruction through control means, and the rod 60 for operating the turning lever shown in FIGS. 4 and 5 is actuated. The discharging lever 53 is turned to the two-dot chain line position 53a shown in FIG. 4 and discharges the empty-bobbin bearing tray 7f onto the empty-bobbin discharging conveyor belt 17 as shown in FIG. 1. When the discharging lever 53 is returned to the original position, the subsequent tray 7a having a fresh cop fitted thereon is moved along the passage 34 by rotation of the disc 35 and is set at the yarn feeding position P.

Figure 6:
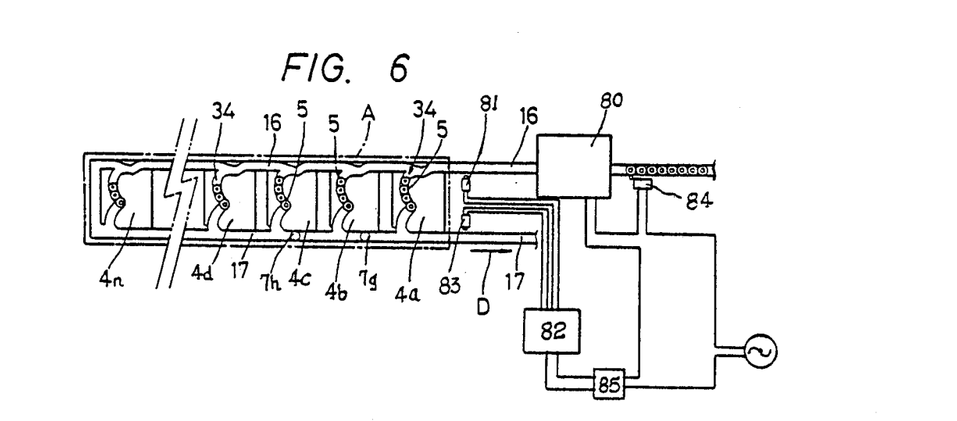
FIG. 6 is a diagram illustrating the structure of one embodiment of the system of the present invention serving a plurality of winding units.

The cop supplying system for a winder A comprising a plurality of winding units arranged in parallel is shown in FIG. 6.

A full cop supplying conveyor 16 is arranged along winding units 4a through 4n of one winder A on the back side thereof, as previously defined. An empty-bobbin discharging conveyor belt 17 is arranged on the front side of the winder. The conveyors 16 and 17 are directly connected to a spinning frame not shown in the drawings, and full cops doffed from the spinning frame are fitted on trays and delivered on the supplying conveyor, while empty bobbins discharged from the winding units are delivered by the conveyor belt 17 to the spinning frame again.

An end take-out device 80 for taking out the yarn end of a full cop 5 is arranged on the supplying conveyor 16 near the entrance of the winder A. More specifically, since the cop to be used by the present system should be supplied to the winding unit in the state where the yarn end is inserted and hung in the central hole 27 of the bobbin as shown in FIGS. 2 and 3, there is disposed an end take-out device 80 which unwinds the tail yarn of a full cop 5 obtained from the spinning process and inserts an appropriate length of the yarn end into the central hole of the bobbin.

A photoelectric switch 81 is arranged between the winder A and the end take-out device 80 to count the number of full cops 5 supplied to the winder A from the end take-out device 80. Every time one full cop 5 passes through the photoelectric switch 81, an addition signal is put out to a counter 82 and "+1" is added to the counter number in the counter. On the side of the empty bobbin discharging conveyor belt 17, near where it exits from the winder A, a photoelectric switch 83 is disposed to check the number of empty bobbins discharged from the winder A. The photoelectric switches 81 and 83 are connected to the counter CO, and the counter 82 is connected to the end take-out device 80 and to a microswitch 84 through a relay 85.

Figure 7:
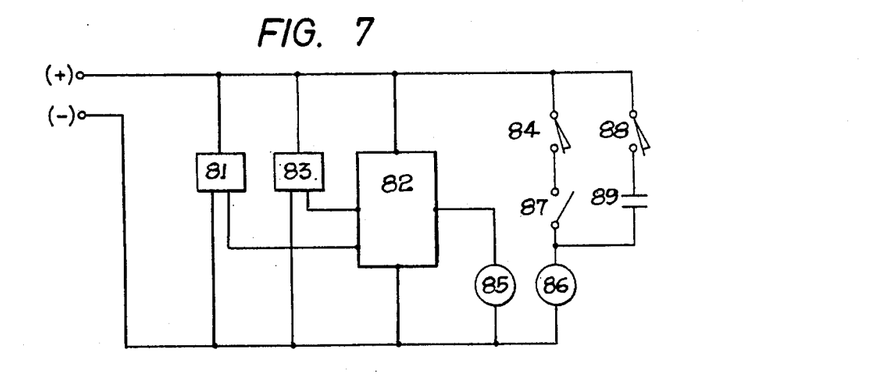
FIG. 7 is a block circuit diagram illustrating a control circuit for supplying cops according to the present invention.

In the embodiment shown in FIGS. 6 and 7, in the case where the winding operation is carried out in the state where the passages 34 of all the winding units 4a through 4n are full of full cops 5 and trays 7, if empty bobbin containing trays 7g and 7h are discharged from the units 4d and 4n, respectively, onto the empty bobbin discharging conveyor belt 17, the trays 7g and 7h are delivered in the direction of an arrow D and pass through the photoelectric switch 83. At this point, the photoelectric switch 83 emits a pulse of subtraction signal for each such tray to the counter 82 in which a predetermined value N is put in advance. N is equal to the total number of full cops 5, including those at the winding positions, necessary to fill all storage passages 34. From the display value is subtracted the number of the pulses emitted from the photoelectric switch 83. Namely, 1 is subtracted from the display value according to one pulse of the subtraction signal. In the above-mentioned case, therefore, 2 is subtracted from the display value, and a value of N-2 is displayed.

An addition-subtraction counter which is turned on when the display value is smaller than the predetermined value N and which is turned off when the display value is larger than or equal to the value N is used as the counter 82. Accordingly, in the above-mentioned case, since two empty bobbins are discharged from the winder A and the displayed value of the counter becomes N-2, the output of the counter is on, and as shown in FIG. 7, relay 85 is excited and a normally open contact 87 of relay 85 is closed. When a full cop 5 stands by at a predetermined gate position just before the end take-out device 80, the microswitch 84 shown in FIG. 6 is closed, holding the full cops 5 in place. A relay 86 for a magnet switch (not illustrated) for driving the end take-out device 80 is excited by the on state of the output of the counter 82, which then opens the microswitch 84, allowing one cop 5 and tray 7 to proceed into the end take-out device 80.

When the full cop 5 is delivered from the end take-out device 80 on the conveyor 16 shown in FIG. 6 and is passed through the photoelectric switch 81, one pulse of an addition signal is emitted from the photoelectric switch 81 and put in the counter 82, whereby the display value of the counter is changed to N-1. Since the display value is still smaller than the predetermined value N, the state where the output of the counter is on is continued, and in the same manner as described above, the microswitch 84 is actuated through the relays 85 and 86, whereby another full cop 5 is placed on the conveyor belt 16 and fed to the winder.

When the second cop 5 passes through the photoelectric switch 81, one pulse of an addition signal is further put in the counter 82 and the counter displays the predetermined value N. At this point, the output of the counter is turned off and the relay 85 is de-energized to stop feeding of full cops.

When, in this case, two full cops are thus fed to the winder A, the full cops are delivered along the conveyor belt 16 in the winder A. At the position of the winding unit 4a, since the predetermined number of full cops 5 are stored in the passage 34, advance of the newly fed full bobbins into the passage 34 is inhibited by the last tray 7c in the passage 34 as described hereinbefore with reference to FIG. 4. They are then fed to the subsequent unit. If the winding units 4b and 4c are similarly full, the full cops also pass through these units. Since, in this example, one empty bobbin has been discharged from the winding unit 4d, an empty space for one tray is formed in the passage 34 of the unit winding unit 4d. Accordingly, the tray having the first full cop fitted thereon, which has been delivered on the conveyor 16, is automatically advanced into the passage 34 of the unit 4d. Similarly, the other full cop is supplied to the unit 4n.

If the photoelectric switch 83 shown in FIG. 6 checks the number of the bobbins discharged from the winder A and the display value of the counter 82 becomes smaller than the predetermined value, the end take-out device 80 is immediately operated to supply the same number of full cops to the winder as the number of the discharged empty bobbins from the winder. Accordingly, the predetermined number of full cops are always contained in the winder as a whole.

We claim:

1. In an automatic winder, for winding yarn from a cop to a package wherein said cop comprises yarn wound upon a bobbin, having a plurality of winding units, the improvement comprising a cop supply system consisting of: a device for carrying the cop, said device supporting the cop thereon by engaging said bobbin; conveyor means for transferring said device to each winding unit of the automatic winder; means for supplying the cop to the winding unit and for feeding a yarn from said cop to be wound, while retaining said cop on said device; and means for transferring said device carrying the unwound empty bobbin from the winding unit.

2. A cop supplying system as claimed in claim 1, wherein said device for carrying said cop is a tray comprising a disc-like base to be placed on the conveyor means, a disc-like stand mounted on the top face of said base, and a peg vertically projected from said stand; said peg being configured so as to support said cop thereon.

3. A device for carrying a cop as claimed in claim 2, wherein an opening is communicated from a hollow interior portion of said peg through said stand and said base, forming an opening on the face of said base resting upon the conveyor, and wherein an air jet hole, communicated to said hollow interior portion, is formed on the top face of the said peg.

4. A cop supplying system as claimed in claim 1, wherein said conveyor means comprises a full cop delivery conveyor belt; said means for transferring said empty bobbin from said winding unit comprises an empty bobbin delivery conveyor belt; said conveyor belts being arranged along each of the plurality of winding unit of the winder; and said means for supplying a cop to the winding unit includes cop delivery passages, comprising a first passage and a second passage, formed to pass through said winding unit between said conveyor belts; said passages being defined by a first guide plate, and a second guide plate confronting said first guide plate.

5. A cop supplying system as claimed in claim 4, further including a third cop delivery passage for guiding said device, formed between a guide face of a third guide plate, secured to the winding unit at the side portion of the full cop delivery conveyor belt, and a guide face of the second guide plate confronting the third guide plate so that said device is guided by said third passage from said full cop delivery conveyor belt to said first passage.

6. A cop supplying system as claimed in claim 5, wherein said device for carrying said cop is a tray comprising a disc-like base to be placed on said conveyor, a disc-like stand mounted on the top face of said base, and a peg vertically projected from said stand; said peg being configured so as to support said cop thereon; and wherein the width of said passages is slightly larger than the diameter of said stand of said tray, the lower surface of said first passage being formed into a freely rotatable disc, and the lower surface of said second passage being formed into a plain plate, said plain plate and said disc being coplanar but having a clearance formed therebetween, said clearance being further formed at a position whereat said cop is placed for taking out the yarn during winding, and said clearance further serving as a passage for jetting air from a nozzle through an opening in the bottom surface of said base communicating with a hollow interior portion of said peg and thence through an air jet hole formed on the top face of said peg.

7. A cop supplying system as claimed in claim 6, wherein a turning lever, for positioning the cop and discharging the bobbin supported on the peg of the tray, is provided swingably about a shaft supported on the plain plate; said turning lever having a first position wherein it falls in abutting contact with the disc-like stand of the tray, said turning lever including a curved guide face means for inhibiting delivery of a subsequent tray having a fresh cop fitted thereon, and a second guide face means for pushing out the tray bearing said bobbin and discharging it along said second passage; and a second position wherein a hook portion formed thereon is able to project into said first passage and contact the stand of the tray bearing the cop to set said cop at the winding position.

8. A cop supplying system as claimed in claim 1, further comprising: cop passage and bobbin passage detecting switches disposed adjacent said conveyor means and said means for transferring the device carrying the empty bobbin, respectively, to count full cops entering and empty bobbins exiting said automatic winder; counter means for calculating the total number of full cops present within said winder based on signals from said detecting switches; and means for admitting to said winder additional of said devices carrying full cops when said counter means indicates that less than a predetermined capacity of full cops are within said winder so that the same number of full cops are supplied to the winder as the number of empty bobbins discharged from the winder.

* * * * *

REEXAMINATION CERTIFICATE (1562nd)
United States Patent [19]
Kiriake et al.

[11] B1 4,463,909
[45] Certificate Issued   Oct. 1, 1991

[54] COP SUPPLYING SYSTEM IN AUTOMATIC WINDER

[75] Inventors: Masaharu Kiriake; Akira Shimano, both of Kyoto, Japan

[73] Assignee: Murata Kikai Kabushiki Kaisha, Kyoto, Japan

Reexamination Request:
No. 90/002,204, Nov. 15, 1990

Reexamination Certificate for:
Patent No.: 4,463,909
Issued: Aug. 7, 1984
Appl. No.: 365,648
Filed: Apr. 5, 1982

[30] Foreign Application Priority Data

Apr. 10, 1981 [JP] Japan ................... 56-54528
Sep. 30, 1981 [JP] Japan ................... 56-155540

[51] Int. Cl.$^5$ .................... B65H 54/20; B65H 67/02
[52] U.S. Cl. .................................... 242/35.5 A
[58] Field of Search ............... 242/35.5 A, 35.5 R, 242/35.6 R, 18 R; 57/284, 289, 290

[56] References Cited

U.S. PATENT DOCUMENTS

| | | | |
|---|---|---|---|
| 3,791,121 | 2/1974 | Ernst | 57/284 X |
| 3,828,542 | 8/1974 | Boutonnet et al. | 57/284 X |
| 3,987,611 | 10/1976 | Kitamura et al. | 57/284 |

FOREIGN PATENT DOCUMENTS

| | | |
|---|---|---|
| 1560585 | 4/1963 | Fed. Rep. of Germany |
| 1760689 | 7/1967 | Fed. Rep. of Germany |
| 7301717 | 5/1973 | Fed. Rep. of Germany |
| 4021490 | 5/1968 | Japan |
| 49-12128 | 3/1974 | Japan |
| 5225139 | 8/1975 | Japan |

*Primary Examiner*—Stanley N. Gilreath

[57] ABSTRACT

A cop supplying apparatus in an automatic winder includes a full cop delivery conveyor belt and an empty cop delivery conveyor belt arranged along each of a plurality of winding units of the winder. A cop fitted on an individual cop delivering carrier is travelled on the conveyor belt and a passage for receiving the carrier from the conveyor belt is formed in each winding unit. The cops are located at predetermined position of the passage and after a predetermined number of carriers have been stored on the passage, subsequent cops are blocked by the last carrier stored in the passage. The device for delivering the cop to the yarn feed position from the conveyor belt is constructed by a rotary disc and guide plates which are forming the passage for the carrier on the disc.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-8, dependent on an amended claim, are determined to be patentable.

New claims 9-16 are added and determined to be patentable.

1. In an automatic winder, for winding yarn from a cop to a package wherein said cop comprises yarn wound upon a bobbin, having a plurality of winding units, *at least one of the winding units defining an unwinding position*, the improvement comprising a cop supply system consisting of:

a device for carrying the cop, said device supporting the cop thereon by engaging said bobbin;

conveyor means for transferring said device to each winding unit of the automatic winder [,] ;

*supply* means for supplying the cop to the winding unit and for feeding a yarn from said cop to be wound, while retaining said cop on said device; and

*transfer* means for transferring said device carrying the unwound empty bobbin from the winding unit,

*the supply means comprising a plurality of substantially fixed guide plates for engaging a device on at least one of the conveyor means and the transfer means and for diverting movement of the device relative to at least one of the conveyor means and the transfer means, whereby a device having a cop thereon is diverted from the conveyor means toward the unwinding position.*

*9. A system for supplying a cop to a winding unit in an automatic winder, the cop being supported on a tray and comprising yarn wound around a bobbin, the winding unit defining an unwinding position at which yarn is unwound from the cop to produce an empty bobbin, the system comprising:*

*a first conveyor for transporting a tray having a cop thereon toward the winding unit,*

*a second conveyor for transporting a tray having an empty bobbin thereon from the winding unit,*

*a plurality of substantially fixed guide plates for engaging a tray on at least one of the first conveyor and the second conveyor and for diverting movement of the tray relative to at least one of the first conveyor and the second conveyor, the plurality of guide plates defining at least one of*

*a first passage arranged to divert a tray having a cop thereon from the first conveyor toward the unwinding position, and*

*an empty-bobbin discharging passage arranged to divert a tray having an empty bobbin thereon from the unwinding position toward the second conveyor.*

*10. A system as in claim 9 wherein the tray comprises a support plate and a peg projecting from the support plate, the peg being adapted to have a cop fitted thereon.*

*11. A system as in claim 10 wherein the support plate is substantially disc-shaped.*

*12. A system as in claim 9 comprising:*

*a disc rotatable about an axis of rotation, the disc being positioned so that at least a portion of the disc defines a bottom for the first passage and at least a portion of the disc is in frictional contact with the first conveyor, whereby the disc is rotated about the axis of rotation by movement of the first conveyor.*

*13. A system as in claim 12 wherein the axis of rotation of the disc is vertically inclined.*

*14. A system as in claim 9 comprising:*

*an inclined planar plate positioned so that at least a portion of the plate defines a bottom for the empty-bobbin discharging passage.*

*15. A system as in claim 9 wherein the first passage is configured to enable the introduction of a predetermined number of trays into the first passage and to prevent the introduction of a tray in excess of the predetermined number of trays into the first passage, and wherein the plurality of guide plates defines a third passage arranged to guide a tray in excess of the predetermined number of trays away from the first passage and toward the first conveyor.*

*16. A system as in claim 9 comprising:*

*a swivelable support plate for positioning a tray at the unwinding position and for discharging a tray from the unwinding position.*

* * * * *